US010413133B2

(12) United States Patent
Schultz et al.

(10) Patent No.: US 10,413,133 B2
(45) Date of Patent: *Sep. 17, 2019

(54) GLOBAL BACKFLOW PREVENTION ASSEMBLY

(71) Applicant: Ecolab USA Inc., St. Paul, MN (US)

(72) Inventors: Andrew Max Schultz, Minneapolis, MN (US); Ryan Jacob Urban, Plymouth, MN (US); Brian Philip Carlson, Lakeville, MN (US); Jay Anderson, Zumbrota, MN (US); Jeffrey Alan Blansit, Farmington, MN (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/249,815

(22) Filed: Aug. 29, 2016

(65) Prior Publication Data

US 2016/0360935 A1    Dec. 15, 2016

Related U.S. Application Data

(63) Continuation of application No. 14/182,353, filed on Feb. 18, 2014, now Pat. No. 9,433,327.

(Continued)

(51) Int. Cl.
*A47K 5/12*      (2006.01)
*E03C 1/10*     (2006.01)
(Continued)

(52) U.S. Cl.
CPC ............... *A47K 5/12* (2013.01); *E03C 1/046* (2013.01); *E03C 1/104* (2013.01); *E03D 9/031* (2013.01);
(Continued)

(58) Field of Classification Search
CPC ...... F16K 15/00; F16K 27/0209; F17K 17/00; A47K 5/12; E03C 1/046; E03C 1/104; E03D 9/031; Y10T 137/3149
See application file for complete search history.

(56) References Cited

U.S. PATENT DOCUMENTS 3,610,535 A    10/1971  Bradshaw
3,929,149 A *  12/1975  Phillips ................... F16K 15/04
                                                              137/216

(Continued)

FOREIGN PATENT DOCUMENTS

JP           47022660 Y      7/1972
JP           47009756 U1    10/1972
(Continued)

OTHER PUBLICATIONS

JP8-54076, Galatron SRL—English Feb. 27, 1996.
(Continued)

*Primary Examiner* — Craig M Schneider
*Assistant Examiner* — Kevin R Barss
(74) *Attorney, Agent, or Firm* — McKee, Voorhees & Sease, PLC

(57)    ABSTRACT

A backflow prevention assembly for global use with dispensers requiring a variety of backflow prevention devices based on regulatory standards is provided. The assembly includes a housing comprising first and second housing members and including quick connector attachments extending therefrom. The quick connector attachments are non-threaded members configured to be attached to the various measurement and types of connections found throughout the world. A cover is provided for venting purposes to reduce the backflow siphoning forces or pressure, which causes the backflow of a product chemistry. Furthermore, a backflow prevention device is configured to be fluidly coupled to the housing of the present invention to (Continued)

provide for one way flow and the prevention of backflow of a product chemistry into a water supply. The flow control may be selected based on the regulatory standards of the location used.

19 Claims, 14 Drawing Sheets

Related U.S. Application Data

(60) Provisional application No. 61/766,775, filed on Feb. 20, 2013.

(51) Int. Cl.
   *F16K 27/02* (2006.01)
   *E03D 9/03* (2006.01)
   *E03C 1/046* (2006.01)

(52) U.S. Cl.
   CPC ............ *F16K 27/0209* (2013.01); *E03C 1/10* (2013.01); *Y10T 137/7837* (2015.04)

(56) References Cited

U.S. PATENT DOCUMENTS

| | | |
|---|---|---|
| 4,029,260 A | 6/1977 | Herrick |
| 4,080,980 A | 3/1978 | Hunter |
| 4,508,137 A * | 4/1985 | Bolgert .................. F16K 15/02 |
| | | 137/218 |
| 5,021,219 A | 4/1991 | Rudick |
| 5,305,778 A * | 4/1994 | Traylor .................. E03C 1/102 |
| | | 137/216 |
| 5,551,483 A | 9/1996 | Hochstrasser |
| 6,240,953 B1 | 6/2001 | Laughlin |
| 6,299,035 B1 | 10/2001 | Dalhart |
| 6,443,184 B1 | 9/2002 | Funderburk |
| 6,478,047 B1 | 11/2002 | Powell |
| 6,546,946 B2 | 4/2003 | Dunmire |
| 7,331,488 B2 | 2/2008 | Naslund et al. |
| 8,220,293 B2 | 7/2012 | Deppermann |
| 8,336,740 B1 * | 12/2012 | Daansen .............. A47K 5/1207 |
| | | 222/181.3 |
| 8,550,302 B1 | 10/2013 | Laible |
| 9,433,327 B2 * | 9/2016 | Schultz .................... A47K 5/12 |
| 2004/0074539 A1 | 4/2004 | Weis |
| 2006/0157111 A1 | 7/2006 | Mueller |
| 2007/0240765 A1 | 10/2007 | Katzman et al. |
| 2008/0107576 A1 | 5/2008 | Zettlitzer et al. |
| 2013/0020353 A1 | 1/2013 | Schiller et al. |
| 2014/0339259 A1 * | 11/2014 | Freudenberg ........ B67D 7/3209 |
| | | 222/108 |

FOREIGN PATENT DOCUMENTS

| | | |
|---|---|---|
| JP | 48037761 U1 | 5/1973 |
| JP | 1126189 U1 | 8/1989 |
| JP | 854076 | 2/1996 |
| WO | 2003048463 A2 | 6/2003 |

OTHER PUBLICATIONS

Ecolab USA Inc., PCT/US2014/016985 filed Feb. 18, 2014, "The International Search Report and the Written Opinion of the International Searching Authority, or the Declaration", dated Jun. 25, 2014.

* cited by examiner

GLOBAL BACKFLOW PREVENTION ASSEMBLY

CROSS-REFERENCE TO RELATED APPLICATIONS

This application is a continuation application of U.S. Ser. No. 14/182,353, filed Feb. 18, 2014, which claims priority under 35 U.S.C. § 119 to provisional application Ser. No. 61/766,775, filed Feb. 20, 2013, the contents of which are all herein incorporated by reference in their entirety.

FIELD OF THE INVENTION

The present invention relates generally to dispensers used to dispense a product chemistry formed between a liquid and a solid product chemistry. More particularly, but not exclusively, the invention relates to a global backflow prevention assembly that would require a minimum number of changes for global installation in a dispenser.

BACKGROUND OF THE INVENTION

Some dispensers, such as cleaning detergent dispensers, create the detergent by introducing a liquid, such as water, to contact a solid product chemistry. The resulting solution has a concentration based upon the amount of the solid product chemistry that is eroded and mixed with the liquid. In addition, changes to the flow of the liquid and the addition of makeup liquid to the solution can provide for more control over the concentration of the solution prior to being dispensed for its end use application from the dispenser. The liquid, both the contact liquid and the makeup liquid, can be provided from the same location, which can be a sink, hose, or other standard device of a home or business.

The liquid can be attached to the dispenser via a hose or hoses. However, to avoid contamination of the source of the liquid by the formed solution, backflow prevention devices are included with the dispensers. The backflow prevention devices are generally mounted to a dispenser and connected to the hose or hoses and provide for one-way flow of the liquid to the dispenser and the solid product chemistry, while preventing the formed solution from travelling back through the hose or hoses and into the liquid source, such as a community water source. The use and regulation of the backflow prevention devices is done by a municipality or government, and is generally regulated on a regional or national level.

However, the governments of the different regions and/or nations may have different regulatory requirements for the backflow prevention devices. They do not all agree that the same flow interrupters can be used with a dispenser that is used throughout the various regions and/or nations. Therefore, the dispensers must be made specifically to accommodate the various regulations for the backflow prevention devices, which can include multiple molds, components, etc., which may change over time. This results in a greater cost for designing and manufacturing a dispenser, as they will have to be made specifically for the different regulations around the world.

Therefore, there is a need in the art for a backflow prevention housing and assembly that is modular in the sense that the housing and assembly can be used with a near global or universal variety of flow controls as are acceptable by the various regulations of the regions and nations around the world.

SUMMARY OF THE INVENTION

Therefore, it is principal object, feature, and/or advantage of the present invention to provide an apparatus that overcomes the deficiencies in the art.

It is another object, feature, and/or advantage of the present invention to provide a dispenser with a global platform that requires a minimum number of changes necessary for global installation.

It is yet another object, feature, and/or advantage of the present invention to provide a backflow device that uses common assemblage package, but with functions that satisfy various global backflow standards.

It is still another object, feature, and/or advantage of the present invention to provide a backflow assembly housing that can be used with different backflow controls.

It is a further object, feature, and/or advantage of the present invention to provide a backflow assembly housing that can be snap fit to a dispenser housing to provide quick and easy attachment.

It is yet a further object, feature, and/or advantage of the present invention to provide a backflow assembly housing that includes tube attachments that do not utilize threads so as to be used globally.

It is still a further object, feature, and/or advantage of the present invention to provide a backflow assembly housing that will prevent the backflow of a product chemistry into the water sources used to create the product chemistry.

These and/or other objects, features, and advantages of the present invention will be apparent to those skilled in the art. The present invention is not to be limited to or by these objects, features and advantages. No single embodiment need provide each and every object, feature, or advantage.

According to an aspect of the present invention, a backflow prevention assembly for use with a dispenser is provided. The assembly includes a housing comprising first and second members attached to one another. The first housing member comprises a cover, and the second housing member comprising first and second quick attach connectors configured to be fluidly coupled to an inlet tube and an outlet tube. A flow control is fluidly coupled to the housing and configured to prevent the backflow of a liquid into the inlet tube.

The assembly can be used with poppets, check valves, and pipe interrupters to prevent backflow. The second housing member can comprise a plurality of snap members configured to selectively attach the assembly to the dispenser. The quick attach connectors can comprise a generally round extrusion extending generally downwardly from the second housing member and having an aperture therethrough to provide access to the second housing member, non-threaded connection grooves substantially surrounding the extrusions and configured to fluidly connect the inlet and outlet tubes, and sealing members positioned at the connection grooves to fluidly seal the inlet and outlet tubes.

According to another aspect, the invention includes a backflow prevention assembly. The assembly includes a housing comprising first and second members attached to one another. The first housing member comprises a cover having a raised portion, and the second housing member comprising first and second quick attach connectors configured to be fluidly coupled to an inlet tube and an outlet tube. A flow control is fluidly coupled to the housing and configured to prevent the backflow of a liquid into the inlet tube, and a cover at least partially surrounding the housing and comprising at least one vent therein.

According to yet another aspect of the invention, a dispenser for forming a product chemistry between a liquid and a solid product chemistry is provided. The dispenser includes a dispenser housing, a cavity at least partially within the housing for holding the solid product chemistry, and a liquid source for providing a liquid to contact the solid product chemistry to form the product chemistry. A backflow prevention device is fluidly coupled to the liquid source to prevent the backflow of the formed product chemistry and comprises a housing comprising first and second members attached to one another, the first housing member comprising a cover, the second housing member comprising first and second quick attach connectors configured to be fluidly coupled to an inlet tube and an outlet tube, and a flow control fluidly coupled to the housing and configured to prevent the backflow of a liquid into the inlet tube. The outlet tube is fluidly connected to the liquid source to provide liquid to contact the solid product chemistry.

DETAILED DESCRIPTION OF THE PREFERRED EMBODIMENTS

Figure 1:
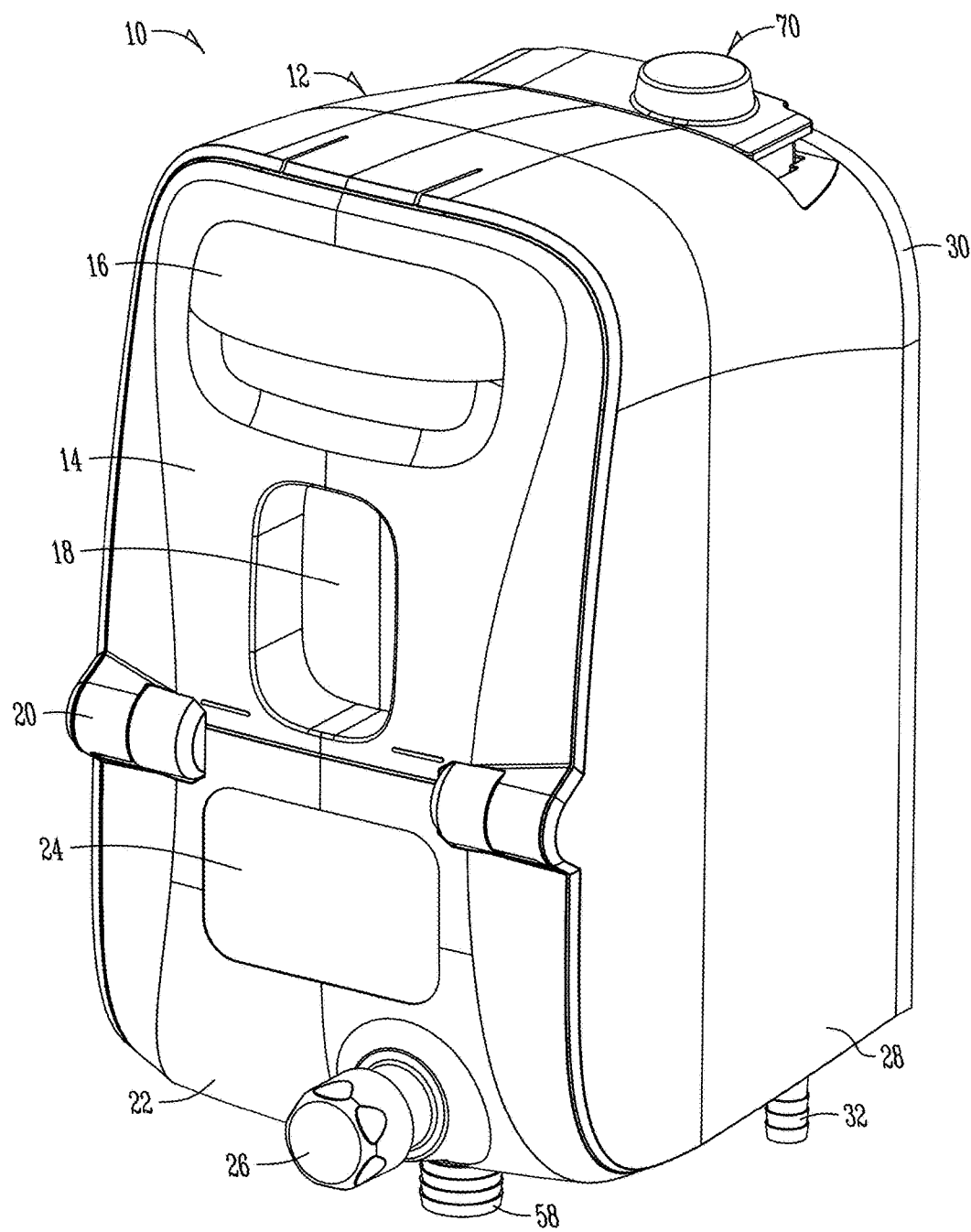
FIG. 1 is a perspective view of a dispenser including a backflow prevention device and assembly.
Figure 2:
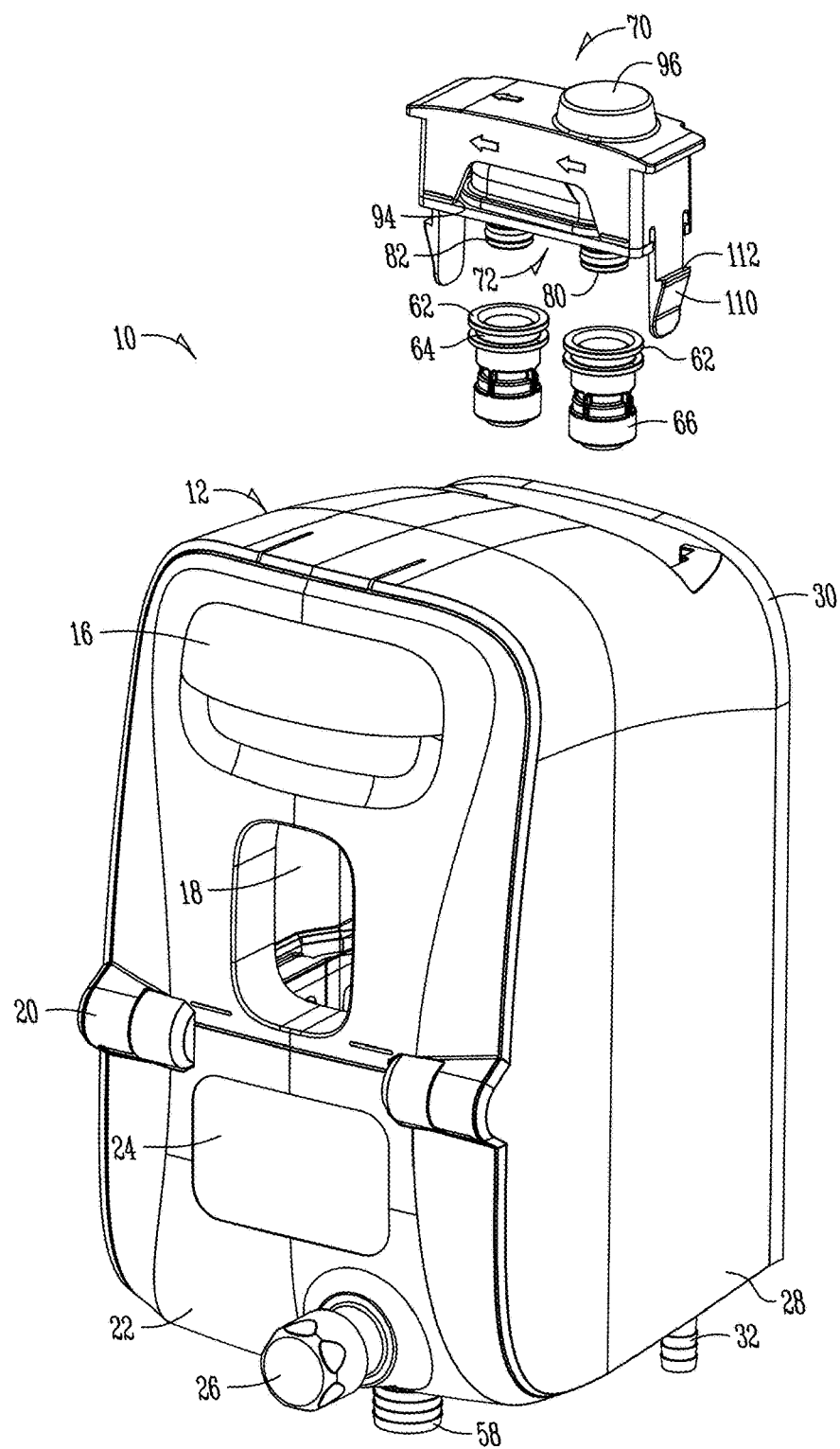
FIG. 2 is an exploded isometric view of the dispenser of FIG. 1.
Figure 3:
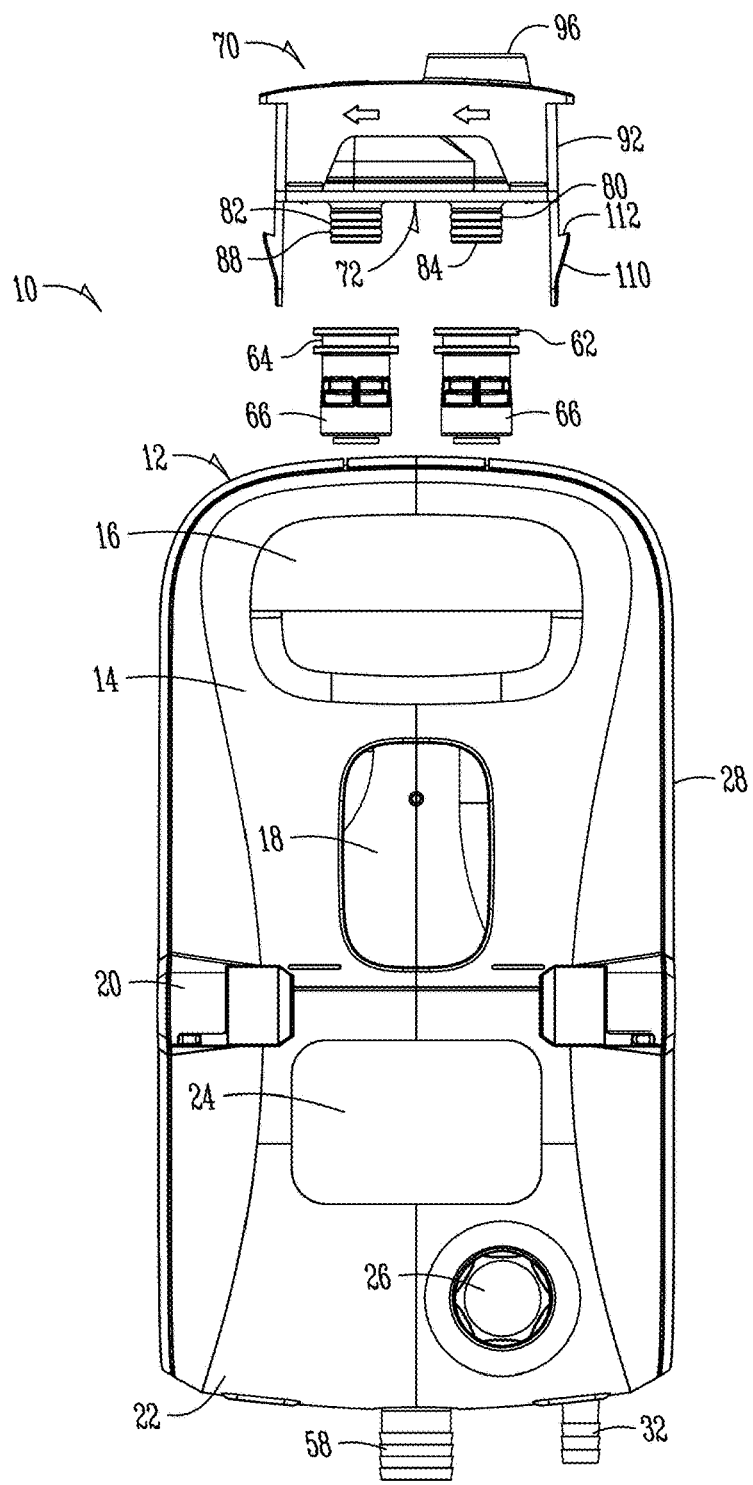
FIG. 3 is an exploded front view of the dispenser of FIG. 1.

FIGS. 1-6 show exemplary embodiments of a dispenser 10 for use with the present invention. However, it should be noted that other types and configurations of dispensers may be used with the invention, and the description and figures of the dispenser 10 are not to be limiting. The dispenser 10 is configured to hold a solid product chemistry that is combined with a liquid, such as water, to create a product chemistry. For example, the solid product chemistry may be mixed with the liquid to create a cleaning detergent. The dispenser works by having the liquid interact with the solid product to form a product chemistry having a desired concentration for its end use application. The liquid may be introduced to a bottom or other surface of the solid product.

Dispensers have typically been launched in one market and then expanded globally at a later date. Differences in the local backflow requirements have often required significant alterations to the dispenser in order to install the new backflow device. The present invention addresses at least some of these issues. As will be appreciated, the O-ring seal ports 80, 82 are designed to install into a universal mating component on the dispenser 10. This feature set removes the need for specific plumbing attachments common to global regions. The backflow assembly 70 is packaged in a space that is designed to accommodate a variety of configurations for global backflow devices 100. The assembly is held in place by snap fits 110 that reduce complexity and do not require tools or fasteners. This elimination of components further makes the component universal. Thus, a housing is provided for use in a near global manner to be used with many types of backflow prevention device required by regional regulations, such that the assemblies include fluid paths that can be fluidly connected to various flow controls, such as pipe interrupters, check valves, or atmospheric vacuum breakers, which will aid in the prevention of backflow.

The backflow assembly of the invention is designed to accommodate the internal features of an atmospheric vacuum breaker (AVB). The poppet and gasket of the AVB are assembled into the assembly and sealed in place without the use of hand tools or fasteners.

The assembly 70 of the present invention can be used with DB flex gap style pipe interrupter 108, with minimal changes made to the housing 72 of the assembly 70. Again, the sealing features, the retention snaps, and the sealing/joining methods are utilized to reduce complexity. Instead of designing a new bracket or feature set to accommodate the new device, the housing holds the internals of the DB style device.

Furthermore, check valves 106 could be inserted in the flow path 78 of the housing 72 of the backflow prevention assembly 70 to meet the dual check requirement of some countries. If none of the mentioned configurations applies, or other internal or upstream backflow devices are installed, the housing can be manufactured as a plumbing component with an unobstructed flow through path. It should be appreciated that all the various configurations allow just the housing to be modified, which creates a more global dispenser.

According to the exemplary embodiments, the dispenser 10 includes a housing 12 comprising a front door 14 having a handle 16 thereon. The front door 14 is hingeably connected to a front fascia 22 via hinges 20 therebetween. This allows the front door 14 to be rotated about the hinge 20 to allow access into the housing 12 of the dispenser 10. The front door 14 includes a window 18 to allow an operator to view the solid product housed within the housing 12. Once the housed product has been viewed to erode to a certain extent, the front door 14 can be opened via the handle to allow an operator to replace the solid product with a new, un-eroded product.

The front fascia 22 may include a product ID window 24 for placing a product ID thereon. The product ID 24 allows an operator to quickly determine the type of product housed within the housing 12 such that replacement thereof is quick and efficient. The ID 24 may also include other information, such as health risks, manufacturing information, date of last replacement, or the like. Also mounted to the front fascia 22 is a button 26 for activating the dispenser 10. The button 26 may be a spring-loaded button such that pressing or depressing of the button activates the dispenser 10 to discharge an amount of product chemistry created by the solid product and the liquid. Thus, the button 26 may be preprogrammed to dispense a desired amount per pressing of the button, or may continue to discharge an amount of product chemistry while the button is depressed.

Connected to the front fascia 22 is a rear enclosure 28, which generally covers the top, sides, and rear of the dispenser 10. The rear enclosure 28 may also be removed to access the interior of the dispenser 10. A mounting plate 30 is positioned at the rear of the dispenser 10, and includes means for mounting the dispenser to a wall or other structure. For example, the dispenser 10 may be attached to a wall via screws, hooks, or other hanging means attached to the mounting plate 30.

The components of the housing 12 of the dispenser 10 may be molded plastic or other materials, and the window 18 may be a transparent plastic such as clarified polypropylene or the like. The handle 16 can be connected and disconnected from the front door 14.

Figure 4:
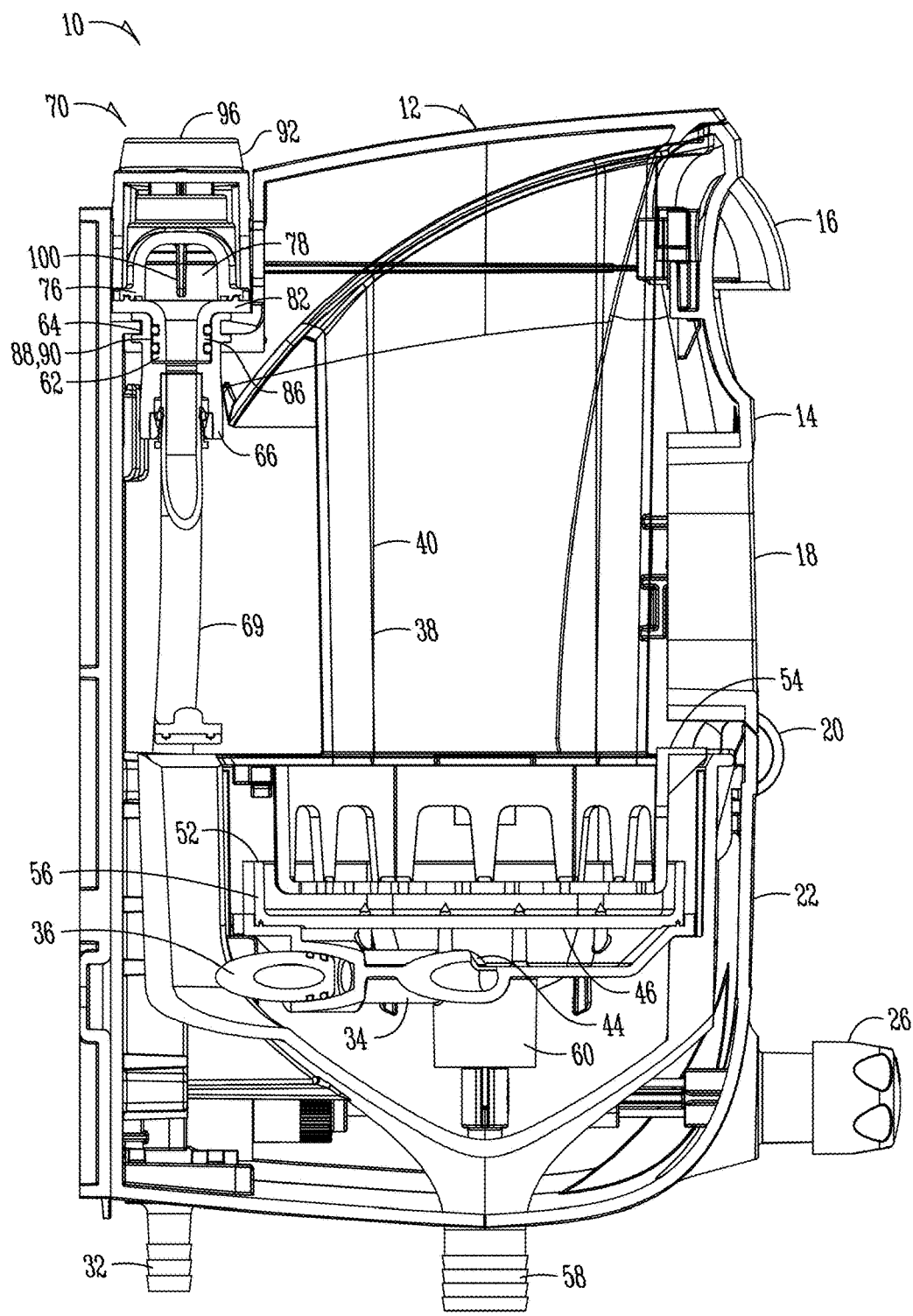
FIG. 4 is a side sectional view of the dispenser of FIG. 1.
Figure 5:
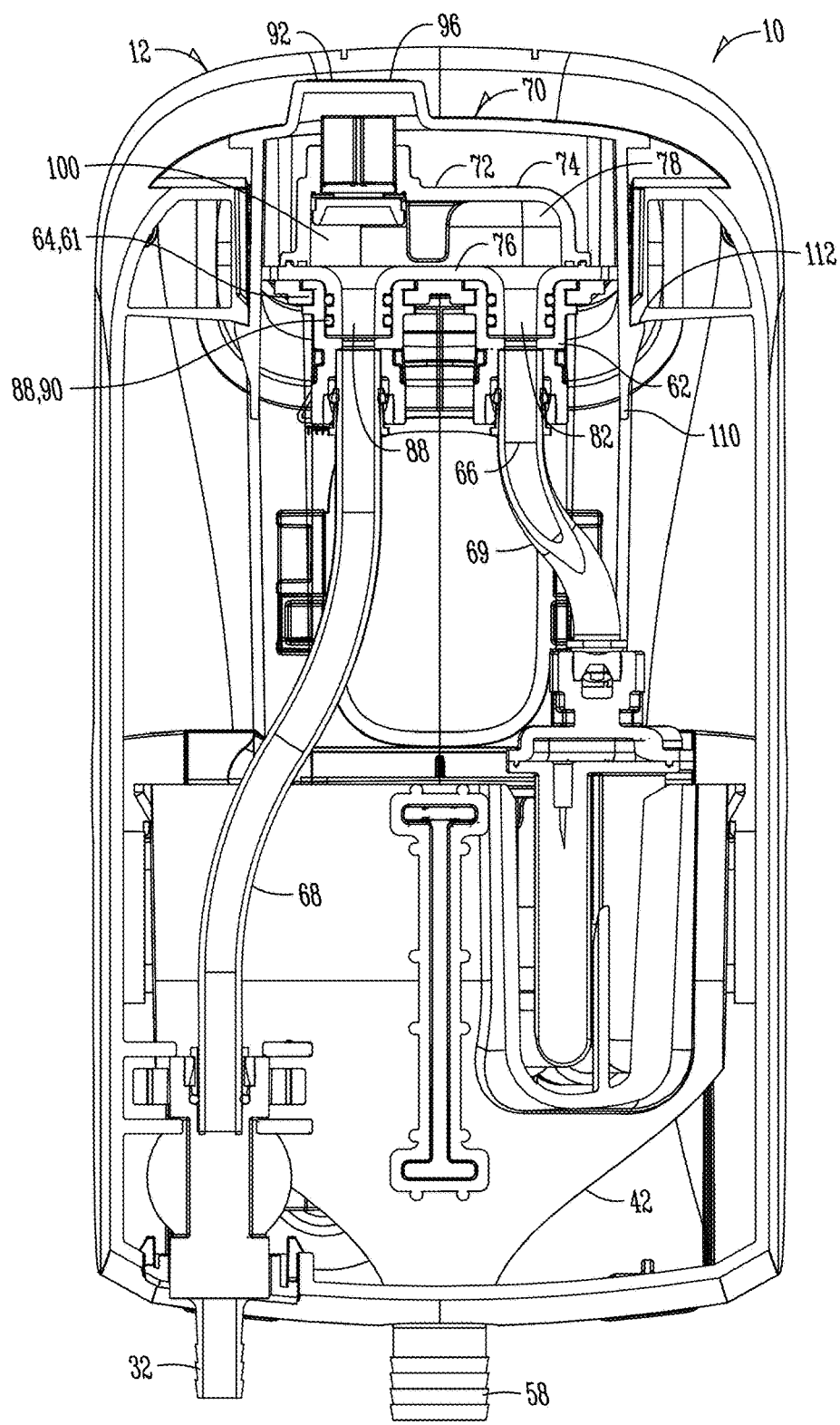
FIG. 5 is a rear sectional view of the dispenser of FIG. 1.
Figure 6:
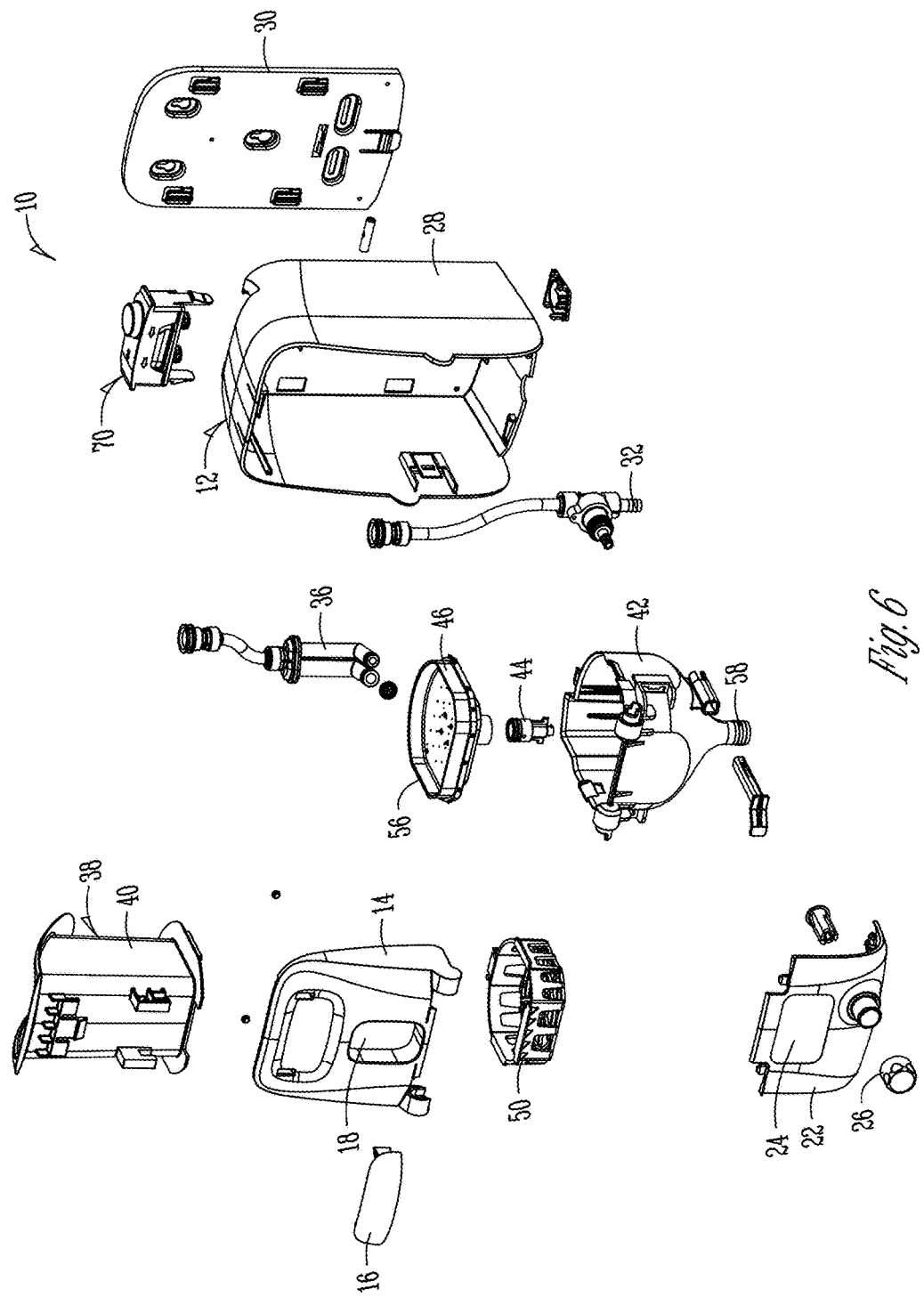
FIG. 6 is an exploded view of the dispenser of FIG. 1.

FIGS. 4-6 show the interior of the dispenser 10. A solid product (not shown) is placed within a cavity 38, which is surrounded by walls 40. The solid product chemistry is placed on a support member 50, which is shown to be a product grate comprising interlocking wires. A liquid, such as water, is connected to the dispenser 10 via the liquid inlet 32 on the bottom side of the dispenser 10. The liquid is connected to the button 26 such that pressing the button will pass liquid into the dispenser 10 to come in contact with the solid product. The liquid is passed through a liquid source 34 via a fitment splitter 36. As shown, the liquid source 34 is a split, two-channeled liquid source for different flow paths. Each of the paths contains a flow control (not shown) to properly distribute liquid in the intended amounts. This flow control can be changed to alter the turbulence of the liquid coming in contact with the solid product to adjust the turbulence based on the characteristics to maintain the formed product chemistry within an acceptable range of concentration. The liquid passes through the liquid source 34 and out the liquid source 44. The liquid source 44 is positioned adjacent a puck member 46, which may also be known as a manifold diffuse, such that the liquid passing through the liquid 44 will be passed through puck ports 48 of the puck member 46.

The liquid will continue in a generally upwards orientation to come in contact with a portion or portions of the solid product supported by the product grate 50. The mixing of the liquid and the solid product will erode the solid product, which will dissolve portions of the solid product in the liquid to form a product chemistry. This product chemistry will be collected in the product chemistry collector 56, which is generally a cup-shaped member having upstanding walls and bottom floor comprising the puck member 46. The product chemistry will continue to rise in the product chemistry collector 56 until it reaches the level of an overflow port 52, which is determined by the height of the wall comprising the product chemistry collector 56. According to an aspect, the product chemistry collector 56 is formed by the puck member 46 and walls extending upward therefrom. The height of the walls determines the location of the overflow port 52. The product chemistry will escape, pass over, or pass through the overflow port 52 and into the collection zone 42, in this case a funnel. The liquid source 34 includes a second path, which ends with a makeup or diluent source 60. Therefore, additional liquid, which also be known as make-up liquid, may be added to the product chemistry in the collection zone 42 to dilute the product chemistry to obtain a product chemistry having a concentration within the acceptable range.

Other components of the dispenser 10 include a splash guard 54 positioned generally around the top of the collection zone 42. The splash guard 54 prevents product chemistry in the collection zone 42 from spilling outside the collection zone 42.

Also shown in the views of the dispenser 10 in at least some of the Figures is a backflow prevention assembly 70 connected to the housing 12 of the dispenser 10. The backflow prevention assembly 70 may be at least partially housed within the housing 12 of the dispenser 10. As discussed above, a liquid is introduced into the interior of the housing 12 of the dispenser 10 to contact a solid product chemistry. The liquid may be introduced via an inlet hose 68 positioned through the liquid inlet 32 in a bottom or side portion of the housing 12. The inlet hose 68 is fluidly connected to the backflow prevention assembly 70. Also included is an outlet tube or hose 69 fluidly connected to the backflow prevention assembly 70 and generally extending to the liquid source 34 and the fitment splitter 36 to provide the liquid to the solid product chemistry within the housing 12.

The backflow prevention assembly 70 is configured to prevent the formed product chemistry between the liquid and the solid product chemistry from moving back through the liquid source 34 and the outlet tube 69, through the assembly 70, and back through the inlet tube 68 and in to the liquid source external of the dispenser, such as the water supply. For example, the initial liquid source may be connected to a local water supply via a sink or other plumbing in a house or business. Allowing the formed product chemistry to contaminate the water supply could make people ill or make the water unusable. Therefore, the backflow prevention assembly 70 provides a means and methods for preventing the backflow of the formed product chemistry into the liquid or water source due to a change in pressure, or back siphoning of the tubes of the dispenser system.

As shown in the Figures, the inlet and outlet tubes 68, 69 may be connected to tube fitments 62 connected to the dispenser housing frame 61. The tube fitments are connection members that include a fitment groove 64 for attaching to the frame, and a connector region 66 for fluidly connecting and sealing the inlet and outlet tubes 68, 69. The tube fitments 62 may be considered part of the housing 12 of the dispenser 10. The inlet and outlet tubes 68, 69 may generally be any material used for fluid tubes, such as plastic, rubber, or the like. In addition, sealing members may be at the connection member 66 of the tube fitment 62 to ensure that no liquid leaks at the connection between the tubes and the fitment. It should also be appreciated that the fitments have an aperture thereto to allow the liquid to pass through the fitments and to or from the backflow prevention assembly 70.

The backflow prevention assembly 70 of the present invention includes generally a housing 72 comprising a first housing member 74 connected to a second housing member 76. The housing members 74, 76 form or define a flow path 78 therethrough to allow the liquid to flow from the inlet tube 68 to the outlet tube 69. The second housing member include first and second quick connector attachments 80, 82 for connecting the backflow prevention assembly 70 to the tube fitments 62 and/or another portion of the dispenser 10. A fluid path is defined as passing from the first quick connector attachment 80 to the second 82. The first and second quick connector attachments 80, 82, as can be seen in the figures, include a round extrusion extending generally downward from the second housing member 76. The connectors have an aperture 86 therethrough as well as one or more grooves 88 formed on the external surface of the connectors. The grooves 88 may be fitted with a sealing member 90, such as an O-ring. The double O-ring fashion of the quick connectors 80, 82 allows for a quick connection between the backflow prevention assembly 70 and the tube fitments 62 of the dispenser 10, without the need to screw or attach the assembly via threads.

It should be appreciated that the non-threaded exterior of the first and second quick connector attachments 80, 82 will allow the backflow prevention assembly 70 to be connected to generally any type of dispenser, regardless of thread type. For example, regions around the world may use different types of threads based upon the metric and SI or English measurement systems. Thus, in the past, each connector for a backflow prevention would have to be specifically fit to match the type of threading for the region to be used, e.g. in Europe the backflow prevention assembly would have to include threads comprising a metric measurement. The various measurements for threads would create the need for numerous molds to make attachment members having these various sizes and measurement types. The double O-ring connection of the backflow prevention assembly 70 will provide the advantage of being able to attach to any type or measurement of a connection portion of a dispenser 10, regardless of the measurement system. Thus, the quick connectors 80, 82 provide a threadless connection for attaching the backflow prevention assembly 70 to a dispenser 10. This will reduce the number of molds required for the different backflow prevention assemblies 70 as the same assembly may be used in both in the U.S. and the rest of the world, regardless of the type of threads or connection apparatus for the dispenser. Furthermore, the use of two O-rings will provide for additional sealing between the backflow prevention assembly 70 and the dispenser 10 such that the liquid will not leak therefrom.

Also included as part of the backflow prevention assembly 70 can be a cover 92 at least partially surrounding the first and/or second housing member 74, 76 of the housing 72 of the backflow prevention assembly 70. The cover 92 provides additional coverage in the form of a smoke stack region 96, as will be discussed. In addition, the cover 92 includes one or more vents 94 therethrough to provide for aiding the backflow prevention of the assembly 70, e.g., the vents 94 provide an escape for the back-siphoning pressure of the system. Furthermore, the cover 92 or the second housing member 76 may include a plurality of snap members 110 extending generally downwardly therefrom. The snap members 110 include a lip 112 for engaging a portion of the housing frame of the dispenser 10. The snap members will hold the backflow prevention assembly 70 in place relative to the dispenser 10. This can be seen best in FIG. 5, where the snap members 110 extending from the second housing member 76 extend downwardly and engage a portion of the housing 12 of the dispenser 10 to hold the backflow prevention assembly 70 in place. However, the snap members can also be pressed or flexed toward one another in order to quickly and easily remove the backflow prevention assembly 70 from the dispenser 10, such as to replace the assembly 70.

Figure 7A:
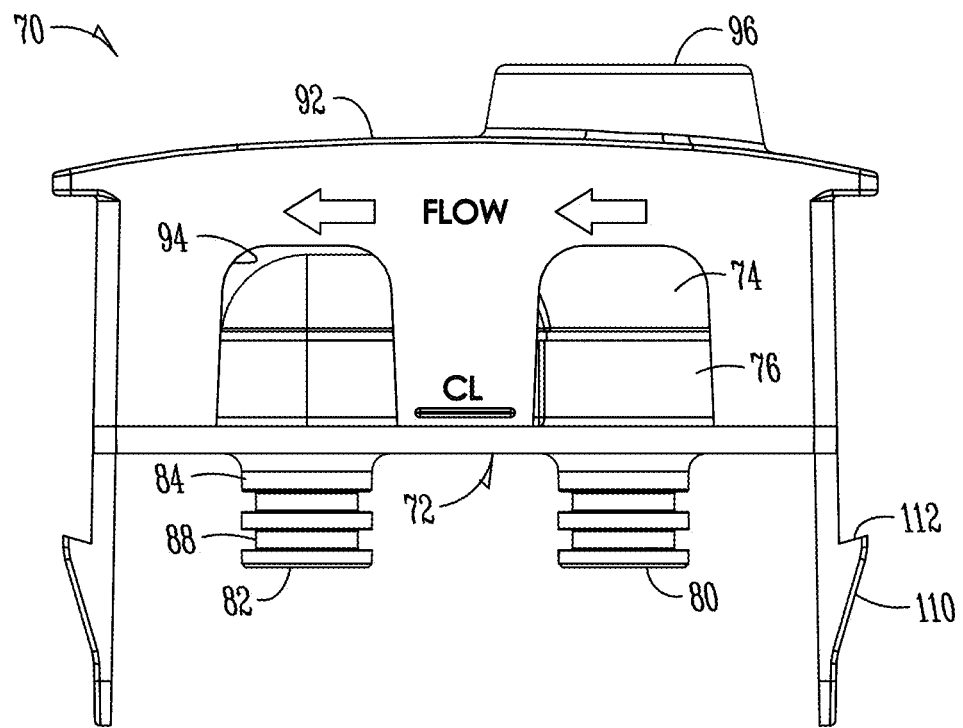
FIG. 7A is a front elevation view of a backflow prevention assembly according to an embodiment of the invention.
Figure 7B:
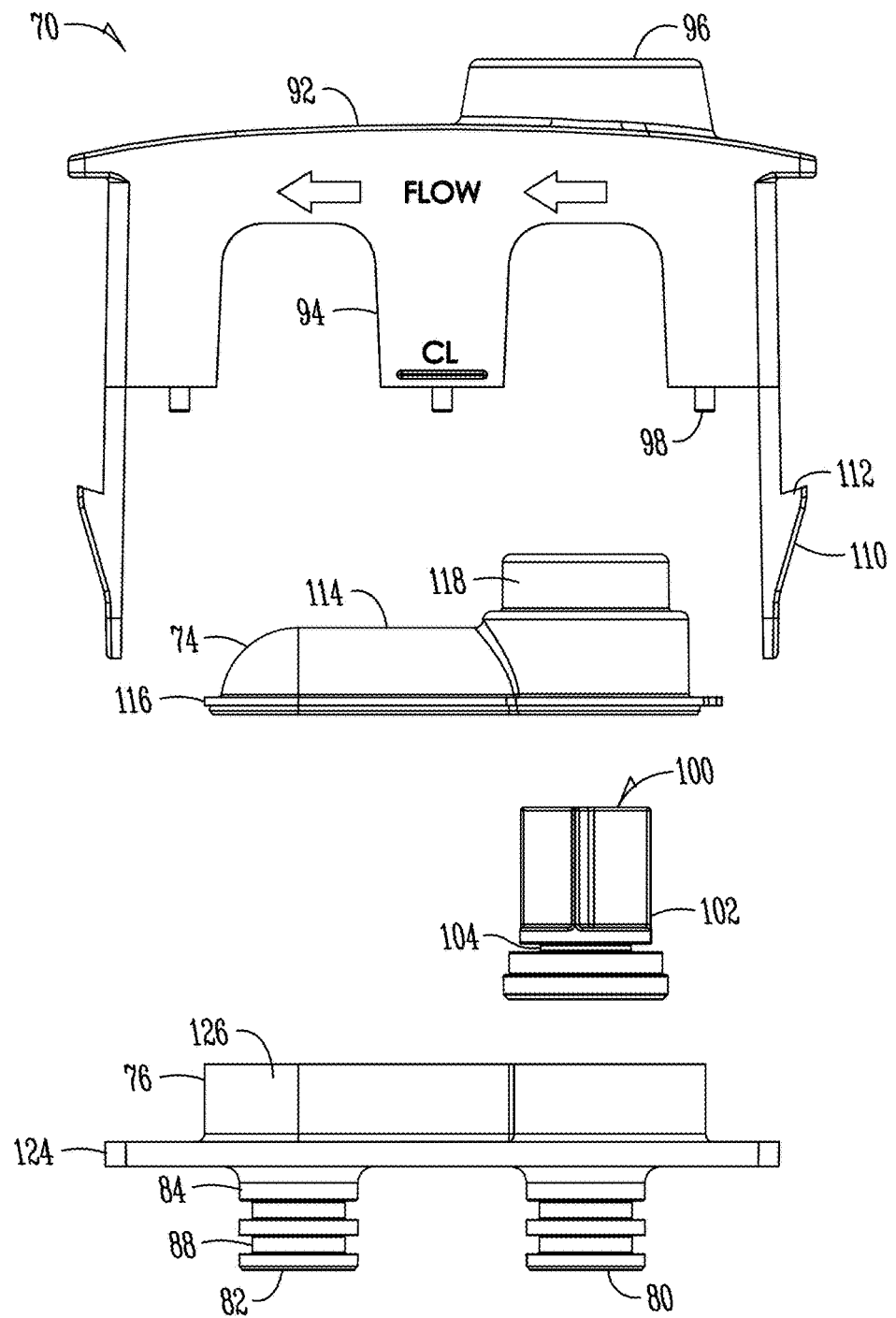
FIG. 7B is an exploded view of the backflow prevention assembly of FIG. 7A.
Figure 7C:
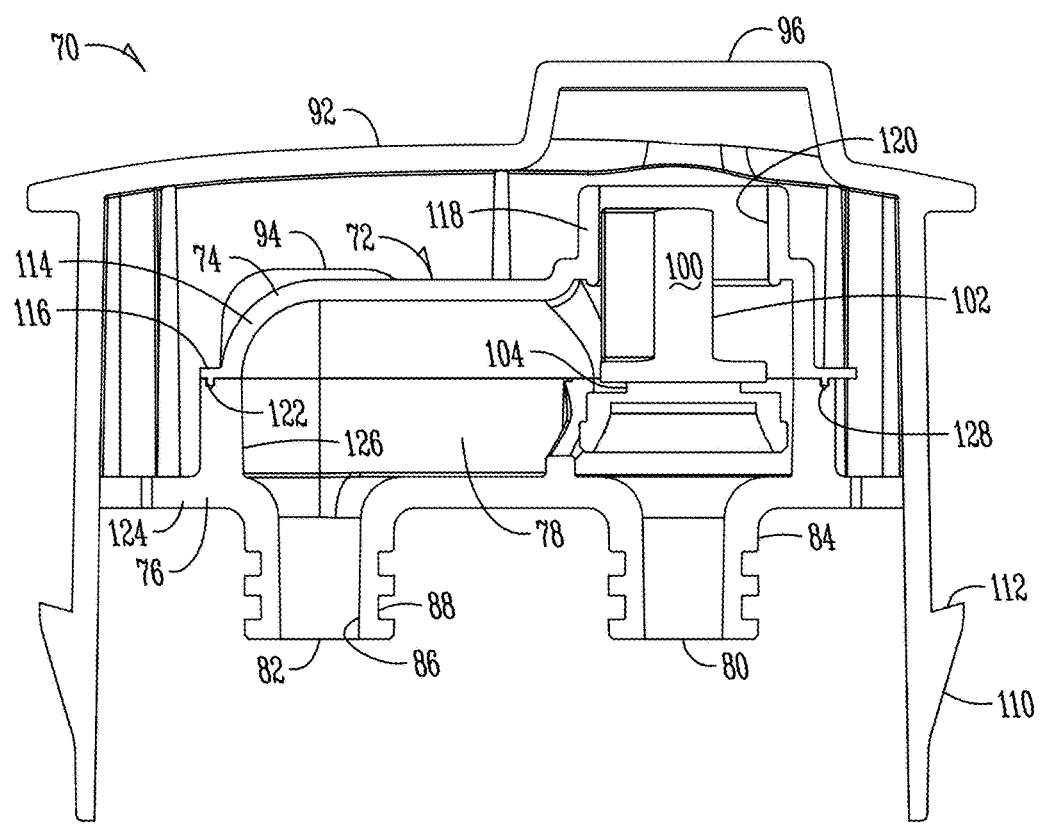
FIG. 7C is a front sectional view of the backflow prevention assembly shown in FIG. 7A.
Figure 8:
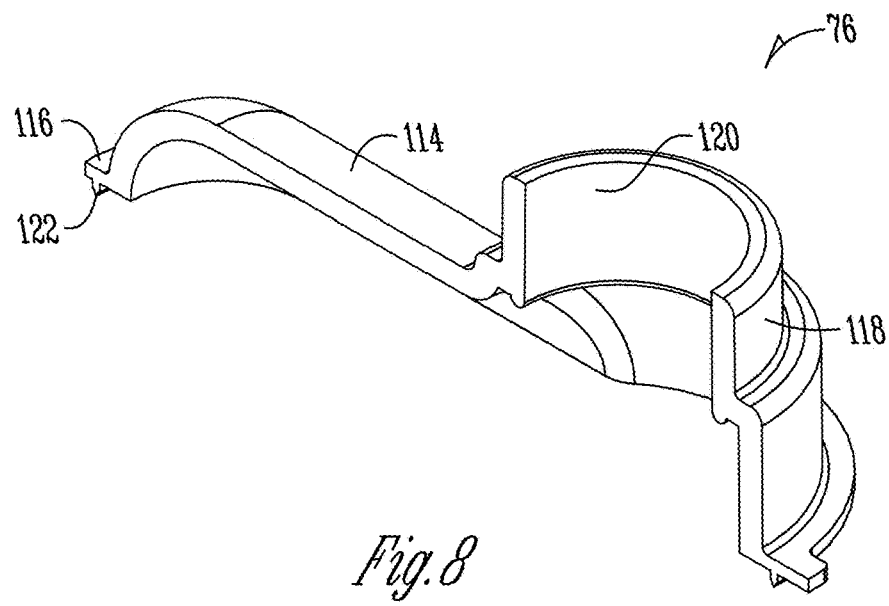
FIG. 8 is a sectional view of a first housing element of a backflow prevention assembly according to an embodiment of the invention.
Figure 9:
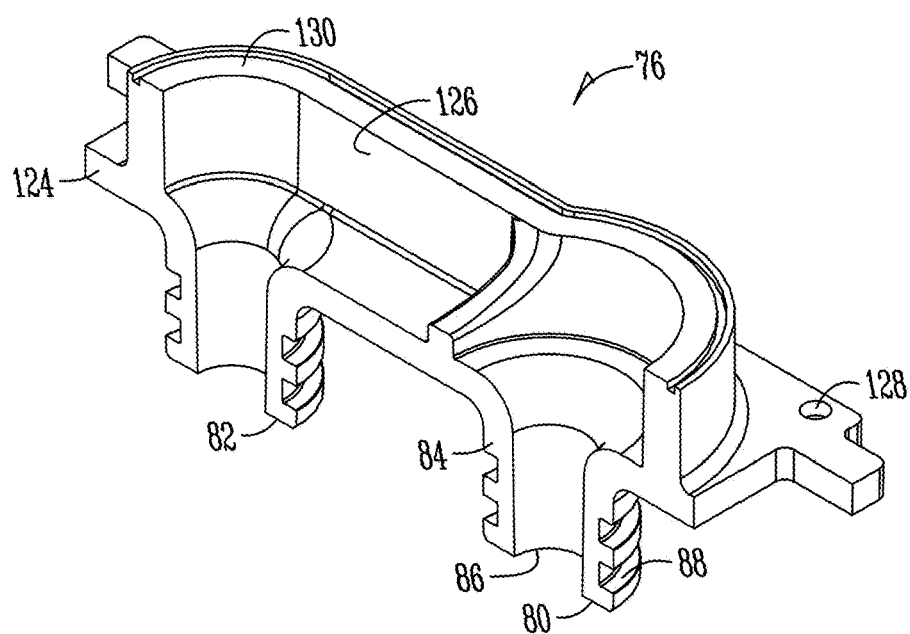
FIG. 9 is a sectional view of a second housing element of an embodiment of the invention.
Figure 10:
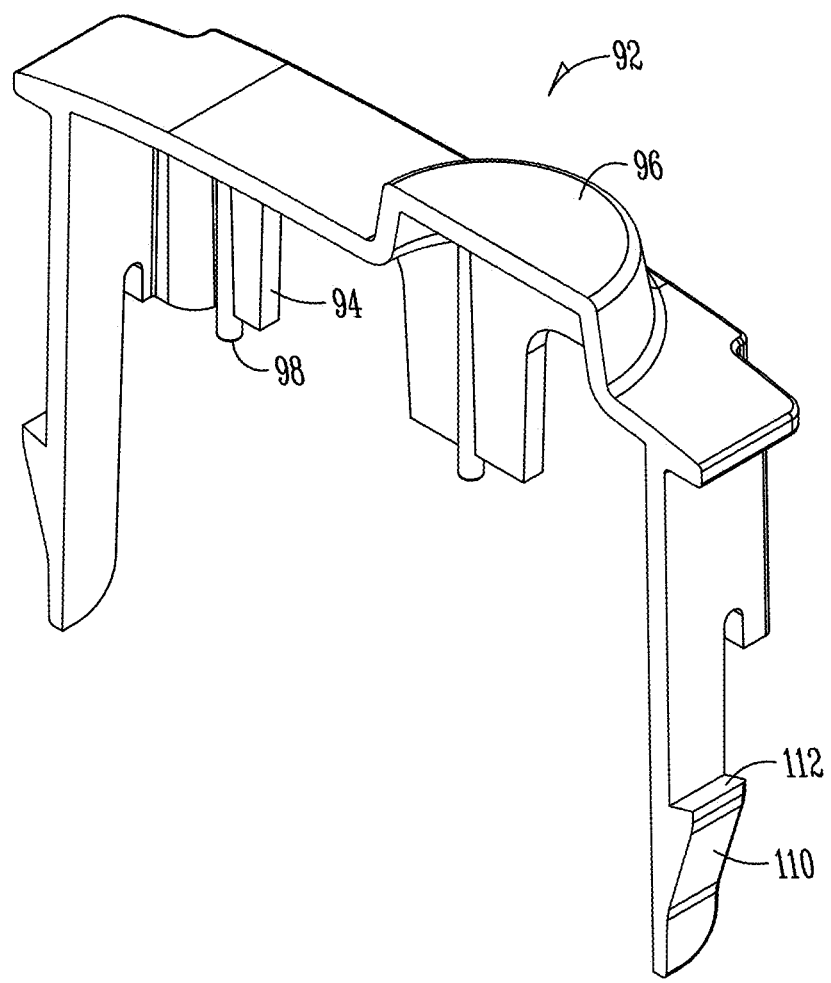
FIG. 10 is a sectional view of a cover element of an embodiment of the invention.

As shown best in FIGS. 7A-C, the backflow prevention assembly 70 includes a flow control 100 for allowing flow of the liquid in only one direction through the backflow prevention assembly 70. The flow control 100 is what prevents the backflow of the product chemistry into the water supply, thus preventing contamination of the water supply. The flow control 100 may be determined by the regulatory bodies of the region of use for the dispenser 10. For example, the United States may have regulations that allow different types of flow controls 100, as opposed to Canada, Europe, the U.K., Australia, etc. Thus, a novel feature of the present invention provides for an assembly 70 including a housing to be able to be used with many types of flow controls, which allows the housing to be used generally globally with minimal changes to the assembly 70.

The present invention shows the use of a poppet 102 with a gasket 104 positioned thereon for use with the assembly 70, which is a type of atmospheric vacuum breaker (AVB). With an AVB, air is allowed to enter the system if a siphon attempts to form. A poppet valve 102 is used. A poppet valve (also called mushroom valve) is a valve typically used to control the timing and quantity of gas or vapor flow. It consists of a hole, usually round or oval, and a tapered plug, usually a disk shape on the end of a shaft also called a valve stem. The shaft guides the plug portion by sliding through a valve guide. In most applications, a pressure differential helps to seal the valve and in some applications also open it. The poppet valve 102 is held "up" by the water pressure found in the system, closing the air entrance to the device. If the pressure in the "upstream side" is reduced to atmospheric pressure or below, the poppet valve 102 drops and allows air to enter the system, breaking the siphon.

However, it should be appreciated that other types of flow controls 100 may be used. For example, some regions of the world require the use of a single or double check valve 106 positioned either in the outlet tube 69 or at least fluidly coupled to the backflow prevention device 70 and/or the tube 68, 69 to prevent the backflow of the product chemistry towards the water supply. The double check valve assembly is suitable for prevention of back pressure and back siphoning. The double check valve 106 consists of two check valves assembled in series. A check valve is a mechanical device, a valve, which normally allows fluid (liquid or gas) to flow through it in only one direction. Check valves are two-port valves, meaning they have two openings in the body, one for fluid to enter and the other for fluid to leave. This employs two operating principles: firstly, one check valve will still act, even if the other is jammed wide open. Secondly, the closure of one valve reduces the pressure differential across the other, allowing a more reliable seal and avoiding even minor leakage. One type of double check valve that may be used with the present invention is part number 15DCV, which can be purchased from John Guest USA Inc. 180 Passaic Avenue, Fairfield, N.J., 07004. However, it is to be appreciated that other part numbers and manufacturers may be included as part of the invention. Thus, the present invention contemplates that a single or double check valve 106 may be connected to either or both of the first and/or second quick connectors 80, 82 to provide for the one way flow of the liquid through the backflow prevention device 70.

Figure 13:
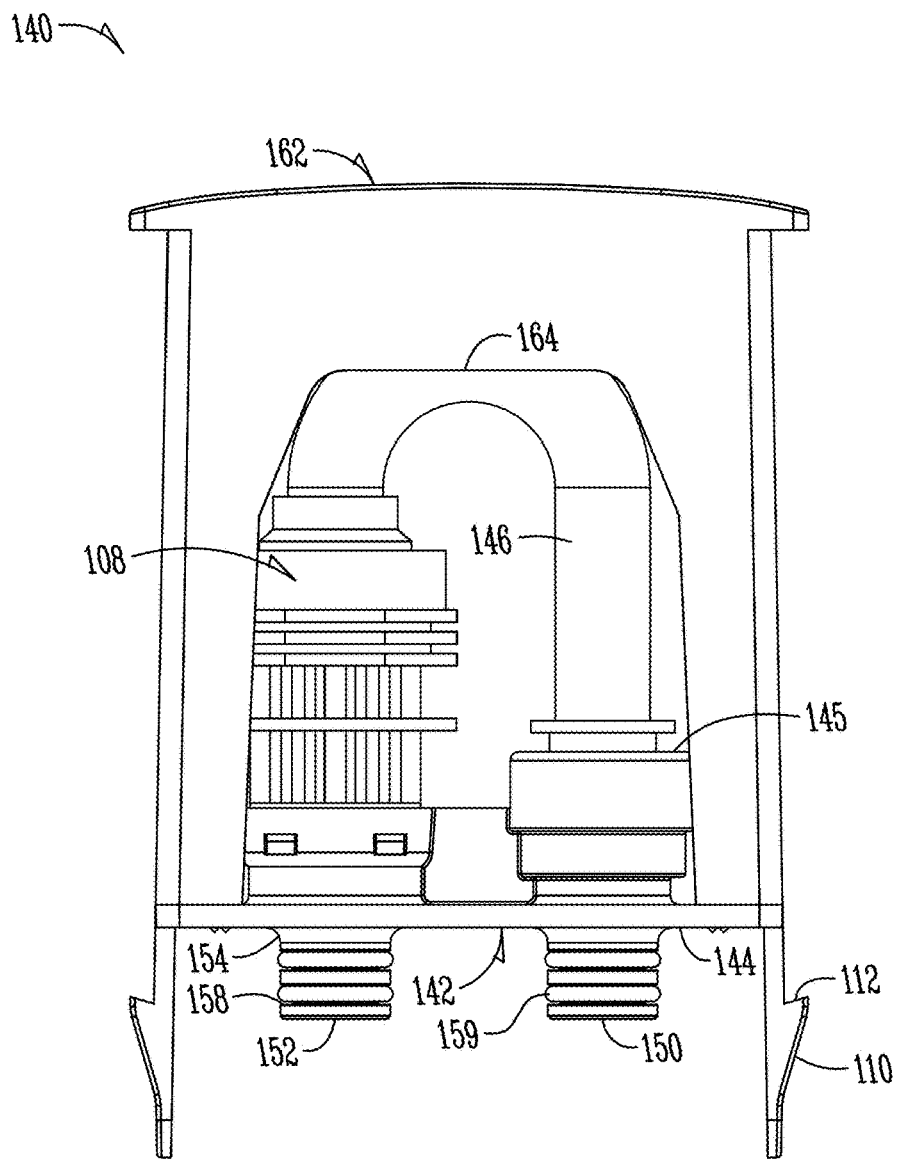
FIG. 13 is a front elevation view of a backflow prevention assembly.
Figure 14:
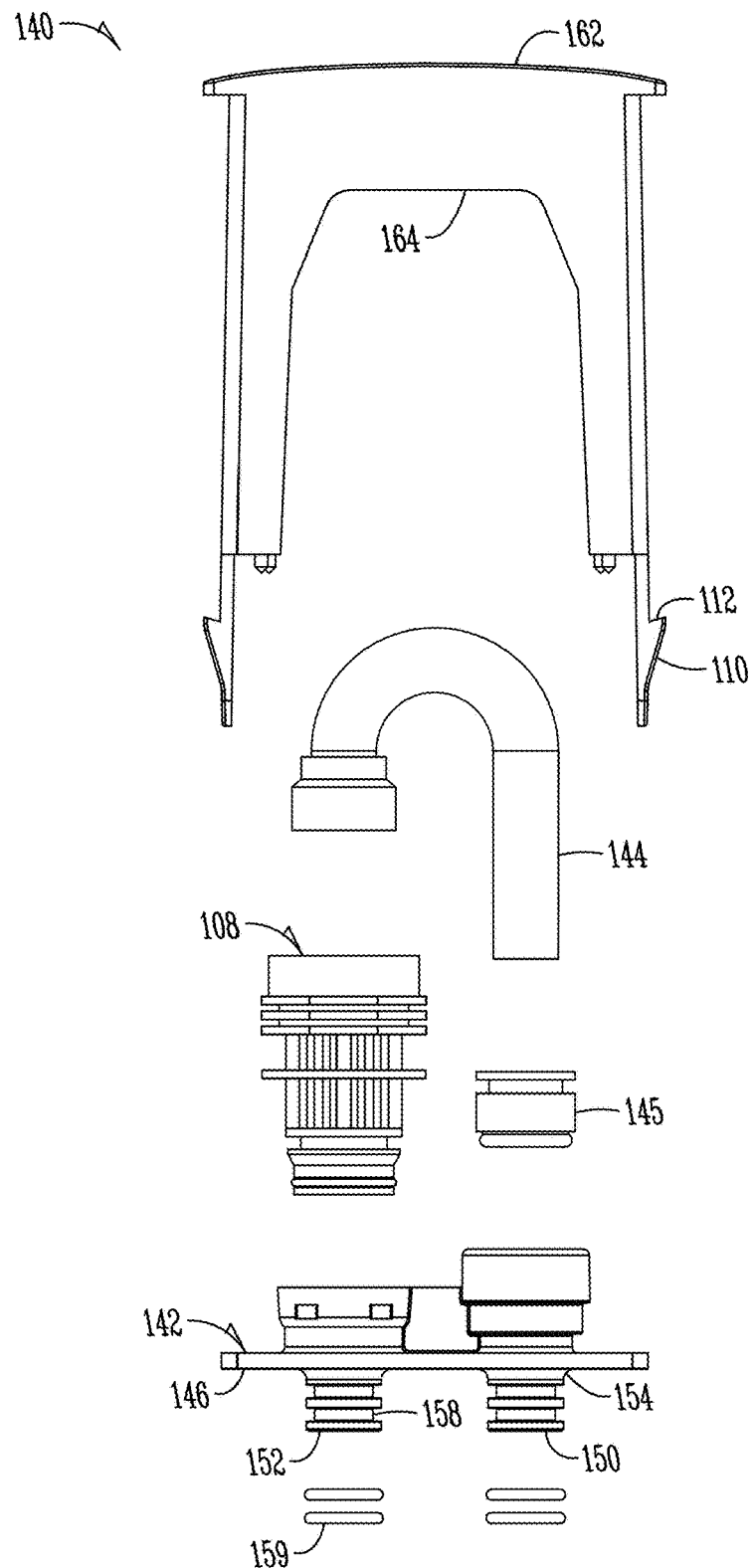
FIG. 14 is an exploded view of the backflow prevention assembly of FIG. 13.

In addition, the present invention contemplates that a pipe interrupter 108 such as a type DB interrupter, which may be model number DB256, purchased from Arrow Valves LTD., 68 High Street, Tring, Hertfordshire, HP23 4AG, may be used with the assembly 140 of the present invention, as can be seen in FIGS. 13 and 14. It should be appreciated that other model types and/or manufacturers may be used as pipe interrupters with the backflow prevention assembly 70 or 140 of the present invention. Similar to the check valve, the pipe interrupter 108 will be fluidly connected to the assembly 140 either via the tubes 68, 69 or the quick connectors 150, 152 to prevent the product chemistry from flowing back through the backflow prevention assembly and towards the water supply. The principle is similar to traditional bicycle tire valves, where the flow enters a tube with the far end blanked off. This tube has several small radial holes, over which a flexible tube is stretched. The forward flow lifts the flexible tube and pushes it against the outer vent holes. When the supply pressure is released, the flexible tube contracts, venting the downstream and covering the inlet holes to prevent back siphoning. It is to be contemplated that other types of flow controls 100, such as one way flow controls, may be operatively or fluidly connected to the backflow prevention device of the present invention without many modifications thereto the assembly, such that the backflow prevention assemblies 70, 140 may be used with dispensers throughout the world.

FIGS. 7A-C shows an exemplary embodiment of a backflow prevention assembly 70 according to the present invention. As mentioned, the assembly 70 includes a housing 72 comprising a first housing member 74 positioned adjacent to and selectively attached to a second housing member 76 to form a flow path 78 for the liquid therethrough. In the embodiments shown in FIGS. 7A-C, a poppet valve 102 comprising a gasket 104 is positioned between the first and second housing members 74, 76 and adjacent the inlet tube 68, which is fluidly connected to the first quick connector attachment 80. The poppet valve 102 can be fluidly positioned within the fluid path between the connectors 80, 82, such that the fluid passing therethrough can act on the valve. The first housing member 74 may include a cover portion 114 for covering a portion or defining a portion of the flow path 78. The first housing member 74 of the figures also includes a flange portion 116 extending generally around the periphery of the cover portion 114 and a raised portion 118. The raised portion 118 extends generally upward from the cover portion 114 and may include an aperture 120 therethrough. It is also contemplated that the first housing member 74 can include one or more pegs 122 for being inserted into an aperture 128 of the second housing member 76.

The second housing member 76 includes an upstanding wall 126 surrounded generally by a flange portion 124. The flange portion may include apertures 128 therethrough to receive pegs 98 from a cover 92. Furthermore, the second housing member 76 may include a lip portion 130. The lip portion 130 can be configured to match the flange portion 116 of the first housing member 74 such that the flange 116 of the first housing member 74 can rest adjacent the lip 130 of the second housing member 76. The first and second housing members 74, 76 can be welded, such as by sonically welding or high frequency welding the components together, as the components may be molded from a plastic or other likes material. The housing members can also be attached to one another by other means, such as by adhesives, seals, attachment members, or the like. This will seal the first and second housing members 74, 76 together such that they will not leak as the liquid is passed through the flow path 78.

A cover, as shown in FIGS. 7A-7C and FIG. 10, at least partially surrounds the housing 72 formed by the first and second housing members 74, 76, and pegs 98 extending therefrom can be positioned through apertures 128 in the second housing member 76. The cover 92 provides venting 94 to aid in controlling the flow control 100 of the backflow prevention assembly 70. The cover can be further attached to the housing by adhesives, glue, or the like. A smokestack 96, or other raised portion may be included extending generally upwardly from the top of the cover 92. As shown in FIGS. 7A-C, and FIG. 9, a plurality of snap members 110 extend generally downward from the cover 92 and include a lip member 112 for attaching the assembly 70 to the housing 12 of the dispenser 10. As the cover 92 comprises a plastic or like material, the snap member 110 may be flexed in an inward manner to release the lip member 112 from the dispenser housing 112 to release the assembly from the dispenser 10.

An exemplary use of the assembly 70 shown and described will be as follows. As shown in FIGS. 7A-B, a poppet 102 having a gasket 104 connected thereto is positioned between first and second housing members 74, 76 to form a housing 72 of the assembly 70. The housing 72 is then attached to the dispenser 10 via the first and second quick connect attachments 80, 82, which in this case comprise double O-rings positioned in grooves 88 of the quick connectors 80, 82. Thus, the housing 72 is fluidly connected to inlet and outlet tubes 68, 69 of the dispenser 10. As mentioned, the tubes may be connected to tube fitments 62 of the dispenser, with the first and second quick connects 80, 82 being quickly and easily connected to the tube fitments 62 without the use of the threading, or the need to match thread sizes and types. Furthermore, the cover 92 will be positioned over the housing 72 of the assembly 70, and the snaps 110 will be positioned adjacent the frame or housing 12 of the dispenser 10 to hold the backflow prevention assembly 70 in place relative to the dispenser 10.

The liquid used to contact the solid product chemistry is introduced to the dispenser via the inlet tube 68. The liquid will continue through the aperture 86 of the first quick connect attachment 80 and into the flow path 78 between the first and second housing members 74, 76 of the housing 72 of the assembly 70. The pressure of the liquid through the first quick connect attachment 80 will cause the poppet valve 102 to move in a generally upward direction, which may cause a portion of the valve to stick out of the aperture 120 of the raised portion 118 of the first housing member 74. However, the closed smokestack or raised portion 96 of the cover will aid in preventing too much movement of the poppet 102. Furthermore, the gasket 104 of the poppet will seal the raised portion 118 of the first housing member 74 such that no liquid will pass therethrough to leak within the dispenser. The fluid moves through the flow path 78 and out the second quick connect aperture and through the outlet tube 69 towards the solid product chemistry. As long as there is no pressure drop, the system will continuously and/or selectively provide the liquid through the backflow prevention assembly 70 as has been described.

However, when there is a pressure drop within the system, the components of the dispenser 10 may create a siphoning effect such that the product chemistry formed between the liquid and solid product chemistry is drawn back up the outlet tube 69 and towards the backflow prevention assembly 70. At such a time, the negative pressure will cause the poppet 102 to move in a downward direction to block the aperture of the first quick connect attachment 80, thus preventing any product chemistry moving back up the outlet tube 69 from being allowed into the inlet tube 68. This backwards siphoning will also be reduced via the vents 94 in the cover 92 of the assembly 70, such that the vents will allow the negative pressure to escape the backflow prevention device until the backflow siphoning is stopped, and the product chemistry is drained back towards the collection zone of the dispenser. Once the pressure has dropped, the liquid will be able to flow again in the manner described above through the inlet tube, which will push the poppet valve 102 in an upward direction, thus opening the flow path 78 through the housing 72 of the assembly 70.

The check valve 106 apparatus and pipe interrupter 108 apparatus will work in a similar manner. For example, as described above, the check valve assembly allows for the liquid to pass through the check valves in only one direction. When the liquid is to move in the opposite direction, the valves close, thus denying the liquid to pass therethrough. In addition, the double check valve will include a release valve to release the negative pressure via the valve, to reduce the back siphoning of the product chemistry through the dispenser. Likewise, the pipe interrupter will work in a similar manner wherein the flow of the liquid is only allowed through one direction of the pipe interrupter. The pipe interrupter includes internal components that prevent the backflow siphoning of the product chemistry through the pipe interrupter, which includes the backflow prevention assembly 70. The pipe interrupter also includes a pressure reducing member to reduce the siphoning and backflow pressure of the system, which causes the backflow siphoning of the product chemistry through the system.

Therefore, the backflow prevention devices all prevent the backflow siphoning of a product chemistry back towards the water supply, which prevents the contamination of the water supply. In addition, the housing assembly 72 of the backflow prevention assembly 70 of the present invention will allow for connection of the various backflow prevention apparatuses to generally any dispenser around the world to account for the different regulatory requirements for the backflow prevention devices around the world. The present invention provides a backflow assembly that uses a common assemblage package to function and satisfy the various global backflow standards. The backflow assembly of the present invention can be used with different backflow controls around the world, thus making it a global backflow assembly housing. This will reduce the number of molds and components needed for use of the backflow prevention devices around the world, which will reduce the costs for producing the dispensers and backflow prevention assemblies with the dispensers found around the world, while still meeting the local regulatory requirements for the backflow prevention standards.

Figure 11:
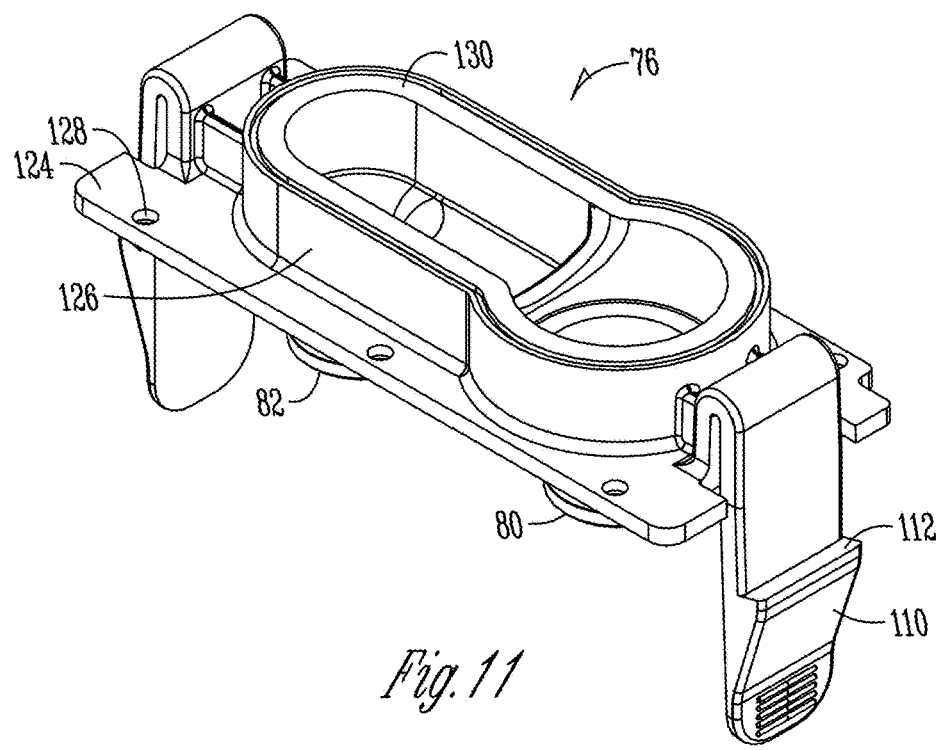
FIG. 11 is a perspective view of another embodiment of a second housing element of the invention.
Figure 12:
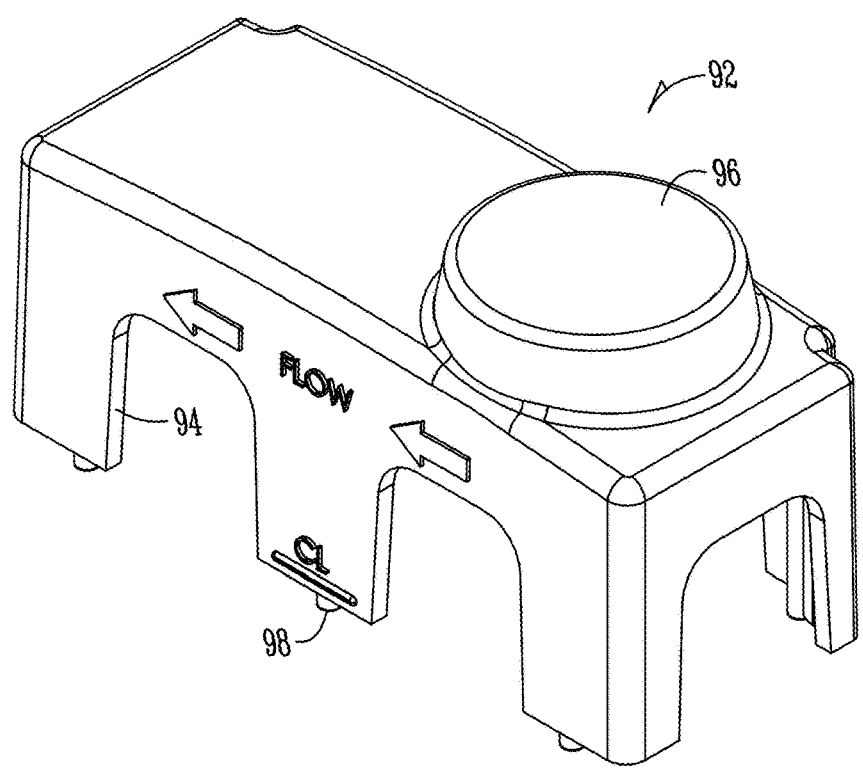
FIG. 12 is a perspective view of another embodiment of a cover element.

FIGS. 11 and 12 show additional embodiments of a second housing member 76 and a cover 92 that can be used as part of the backflow prevention assembly 70 of the present invention. As shown in FIG. 11, the snap members 110 are attached to the flange portion 124 of the second housing member 76, and extend in a generally downward direction therefrom. The cover 92 includes pegs 98 for being inserted to the apertures 128 in the flange 124 of the second housing member. Thus, in the configuration shown in FIGS. 11 and 12, the snap members will still be connected to the housing 12 of the dispenser 10 in a similar fashion as described above, but will be connected to the second housing member 76 instead of the cover 92. However, it should be appreciated that this configuration will not alter the function or capability of the backflow prevention assembly 70 as has been shown and described.

FIGS. 13 and 14 show an embodiment of a backflow prevention assembly 140 including a flow control in the form of a pipe interrupter 108. The assembly 140 includes a housing 142, which includes first and second quick connector attachments 150, 152 extending therefrom. The attachments may be the form as those shown and described previously. The first housing portion 144 includes the attachment members. A fluid path 146, which is shown as a pipe, which may be a copper pipe, is shown to be extending generally from one attachment 150 to the other 152, and in fluid communication therewith to allow a fluid to pass therethrough. A coupling 145 is also shown in the path 146. Adjacent the second attachment 152 and in the fluid path is a pipe interrupter 108, which can be used to prevent the backflow of a fluid back through the fluid path, as has been heretofore described.

Additional aspects of the backflow prevention assembly 140 of FIGS. 13 and 14 include that the attachments comprise double O-rings 159 positioned in grooves 158 of the quick connectors. Furthermore, a cover or lid 162 is provided with a vent 164, which can aid in the operation of the flow control and the backflow prevention assembly 140. The cover 162 can be attached to the housing member 144 as has been shown and described, such as by the use of pegs and sonic welding the components together.

The assembly 140 can be used in parts of the world that require a pipe interrupter to be included as a backflow prevention member, or a flow control member. As is understood, the assembly 140 is very similar to the assembly 70, and included minor variations to provide the different flow control. In all cases, a housing is provided with non-threaded quick connect attachments for attaching the flow control to inlet and outlet tubes of a dispenser such that the backflow prevention assemblies of the invention can be used quickly and easily, and practically anywhere around the world, with minor changes required to change. Furthermore, as all embodiments include a fluid path, which may be defined by first and second housings, copper tubes/pipes, plastic tubes, other housings, etc. extending from first and second quick connector attachments, practically any type of flow control can be quickly and easily added to comply with the regulatory requirements of the various locations around the world.

The foregoing description has been presented for purposes of illustration and description, is not intended to be an exhaustive list or to limit the invention to the precise forms disclosed. It is contemplated that other alternative processes obvious to those skilled in the art are to be considered part of the invention. For example, while particular backflow prevention apparatuses have been discussed, it is contemplated that the backflow prevention assembly of the present invention can be used with generally any backflow prevention device as is required by the regulatory standards around the world. The assembly of the present invention provides a generally global backflow prevention housing for operating with dispensers and backflow prevention devices around the world, which reduces the amount of components and thus the number of molds to reduce the costs for producing the housings and dispensers. It is to be understood that the present invention provides numerous advantages, as has been shown and described.

What is claimed is:

1. A backflow prevention assembly for use with a dispenser, comprising:
   a housing comprising:
      first and second housing members attached to one another, wherein the first and second housing members abut to create a seam along a longitudinal axis; and
      first and second quick attach connectors configured to be fluidly coupled to an inlet tube and an outlet tube; and
   a flow control fluidly coupled to the housing and configured to prevent the backflow of a liquid into the inlet tube;
   wherein the housing defines a flow path substantially parallel to the seam connecting the inlet tube and outlet tube and the flow path comprises a housing cover or a copper tubing having a raised portion extending from the housing cover or the copper tubing such that it is aligned with the flow control and one of the quick attach connectors to aid in preventing movement of the flow control.

2. The assembly of claim 1 wherein the housing forms a closed flow path from the first quick attach connector to the second quick attach connector.

3. The assembly of claim 2 wherein the flow control comprises a poppet positioned in the flow path and adjacent the first or second quick attach connector.

4. The assembly of claim 3 wherein the poppet is configured to move between an open position wherein a fluid is able to pass through the inlet tube, housing, and outlet tube, and a closed position wherein the poppet blocks flow through at least one of the inlet tube, housing, or outlet tube.

5. The assembly of claim 1 wherein the flow control comprises at least one check valve in either the inlet tube or outlet tube.

6. The assembly of claim 1 wherein the flow control comprises a pipe interrupter fluidly coupled to the housing.

7. The assembly of claim 1 wherein the housing further comprises a plurality of snap members configured to selectively attach the assembly to the dispenser.

8. The assembly of claim 1 wherein the first and second quick attach connectors each comprise:
a generally round extrusion extending generally downwardly from the housing and having an aperture therethrough to provide access to the housing; and
non-threaded connection grooves substantially surrounding the extrusions and configured to fluidly connect the inlet and outlet tubes.

9. The assembly of claim 8 further comprising O-rings positioned at the connection grooves to fluidly seal the inlet and outlet tubes.

10. The assembly of claim 1 wherein the housing cover or the copper tubing includes at least one vent.

11. The assembly of claim 1 wherein the first and second quick attach connectors comprise a threadless connection for inlet and outlet tubes such that the connection to the tubes can be substantially universal.

12. A backflow prevention assembly, comprising:
a housing comprising first and second non-threaded quick attach connectors extending therefrom;
a substantially u-shaped fluid path from a first quick attach connector to a second quick attach connector configured to allow a fluid to pass therethrough;
an inlet tube fluidly connected to the first quick attach connector and an outlet tube fluidly connected to the second quick attach connector; and
a flow control fluidly positioned at a corner of the substantially u-shaped fluid path and configured to divert the fluid within the flow control and to prevent the backflow of a fluid from the direction of the outlet tube to the inlet tube;
wherein the first and second quick attach connectors each comprise:
a generally round extrusion extending generally downwardly from the housing and having an aperture therethrough to provide access to the housing;
non-threaded connection grooves substantially surrounding the extrusions and configured to fluidly connect the inlet and outlet tubes; and
sealing members positioned at the connection grooves to fluidly seal the inlet and outlet tubes.

13. The assembly of claim 12 wherein the flow control comprises:
a. a poppet including a gasket;
b. at least one check valve; or
c. a pipe interrupter.

14. The assembly of claim 13 wherein the fluid path comprises:
a. a housing cover, or
b. a copper tubing.

15. The assembly of claim 14 wherein the housing cover or the copper tubing comprises a raised portion extending from the housing cover or the copper tubing such that it is aligned with the flow control and one of the quick attach connectors to aid in preventing movement of the flow control.

16. A dispenser for forming a product chemistry between a liquid and a solid product chemistry, comprising:
a dispenser housing;
a cavity at least partially within the housing for holding the solid product chemistry;
a liquid source for providing a liquid to contact the solid product chemistry to form the product chemistry; and
a backflow prevention device fluidly coupled to the liquid source to prevent the backflow of the formed product chemistry, said backflow prevention device comprising a housing comprising first and second non-threaded quick attach connectors extending therefrom, a substantially u-shaped fluid path between the quick attach connectors, an inlet tube fluidly connected to the first quick attach connector and an outlet tube fluidly connected to the second quick attach connector, and a flow control fluidly positioned at a corner of the substantially u-shaped fluid path and configured to divert fluid within the flow control and prevent the backflow of the formed product chemistry into at least the inlet tube;
wherein the outlet tube is fluidly connected to the liquid source to provide liquid to contact the solid product chemistry; and
wherein said first and second quick attach connectors comprising a threadless connection for the inlet and outlet tubes such that the connection of the tubes is substantially universal.

17. The dispenser of claim 16 wherein the flow control comprises:
a. a poppet including a gasket;
b. at least one check valve; or
c. a pipe interrupter.

18. The dispenser of claim 16 wherein the fluid path comprises:
a. a housing cover, or
b. a copper tubing.

19. The dispenser of claim 16 further comprising a cover at least partially surrounding the housing of the backflow prevention device and comprising at least one vent.

* * * * *